Figure 1:
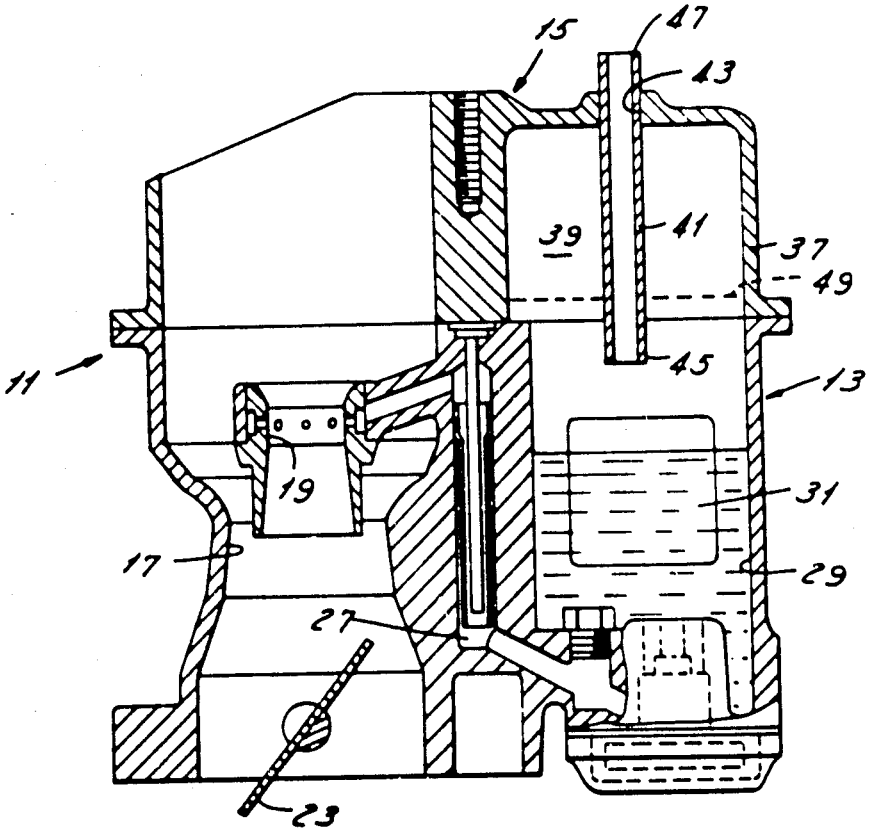
Figure 2:
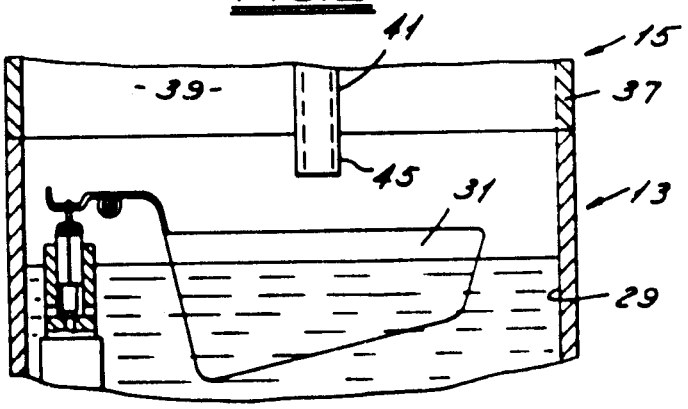

DEFENSIVE PUBLICATION

UNITED STATES PATENT AND TRADEMARK OFFICE

Published at the request of the applicant or owner in accordance with the Notice of Dec. 10, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED DECEMBER 2, 1975

941 O.G. 8

T941,014

SPILL-PROOF VENTED ENCLOSURE

William W. Charron, 3830 McDivitt, Orchard Lake, Mich. 48033, and Max W. Lunsford, 23125 Berg Road, Southfield, Mich. 48075

Continuation-in-part of abandoned application Ser. No. 345,167, Mar. 26, 1973. This application Sept. 5, 1974, Ser. No. 503,533

Int. Cl. F02m 5/02

U.S. Cl. 261—72 R

1 Sheet Drawing. 5 Pages Specification

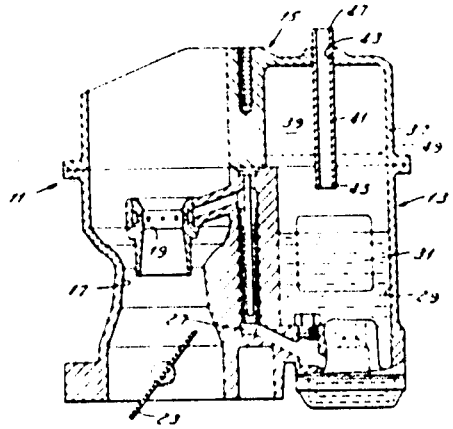

A spill-proof vented enclosure suitable for use as a fuel bowl of an internal combustion engine carburetor. The bowl or enclosure includes an enlarged vapor dome having a depending vent tube. The inlet to the vent tube within the bowl is centrally located within the enclosure and remains above the fuel level irrespective of the position of the carburetor relative to the horizontal.